United States Patent [19]

Fiori et al.

[11] Patent Number: 4,535,666
[45] Date of Patent: Aug. 20, 1985

[54] BAND SAW

[75] Inventors: Robert Fiori, Connaux; Philippe Seyfried; José Symard, both of Bagnols sur Ceze, all of France

[73] Assignee: Commissariat a l'Energie Atomique, Paris, France

[21] Appl. No.: 495,935

[22] Filed: May 18, 1983

[30] Foreign Application Priority Data

May 18, 1982 [FR] France .................. 82 08702

[51] Int. Cl.³ .............................. B23D 53/04
[52] U.S. Cl. ........................ 83/795; 83/466; 83/800; 83/816; 83/820
[58] Field of Search .......... 83/795, 797, 816, 818, 83/819, 820, 788, 799, 800, 814, 466

[56] References Cited

U.S. PATENT DOCUMENTS

| | | |
|---|---|---|
| 1,372,903 | 3/1921 | Perkins et al. |
| 1,726,893 | 9/1929 | Grigsby ............................ 83/796 X |
| 1,848,300 | 3/1932 | Avilla ............................. 83/814 X |
| 1,946,785 | 2/1934 | Everett ............................ 83/795 |
| 2,472,509 | 6/1949 | Anderson ......................... 143/157 |
| 2,933,116 | 4/1960 | White ............................. 83/814 |

FOREIGN PATENT DOCUMENTS

| | | |
|---|---|---|
| 1114511 | 4/1956 | France . |
| 2339461 | 8/1977 | France . |
| 1023455 | 3/1966 | United Kingdom . |
| 1437556 | 5/1976 | United Kingdom . |
| 1445819 | 8/1976 | United Kingdom . |

Primary Examiner—Frank T. Yost
Attorney, Agent, or Firm—Pearne, Gordon, Sessions, McCoy, Granger & Tilberry

[57] ABSTRACT

A band saw and an assembly having an interchangeable casing bearing the saw blade, the saw comprising a leading wheel and at least one led wheel on which the blade is mounted; one of the wheels can be moved by tensioning means between a blade-tensioning position and an action-taking position in which the assembly comprising the casing and the blade can be interchanged.

9 Claims, 10 Drawing Figures

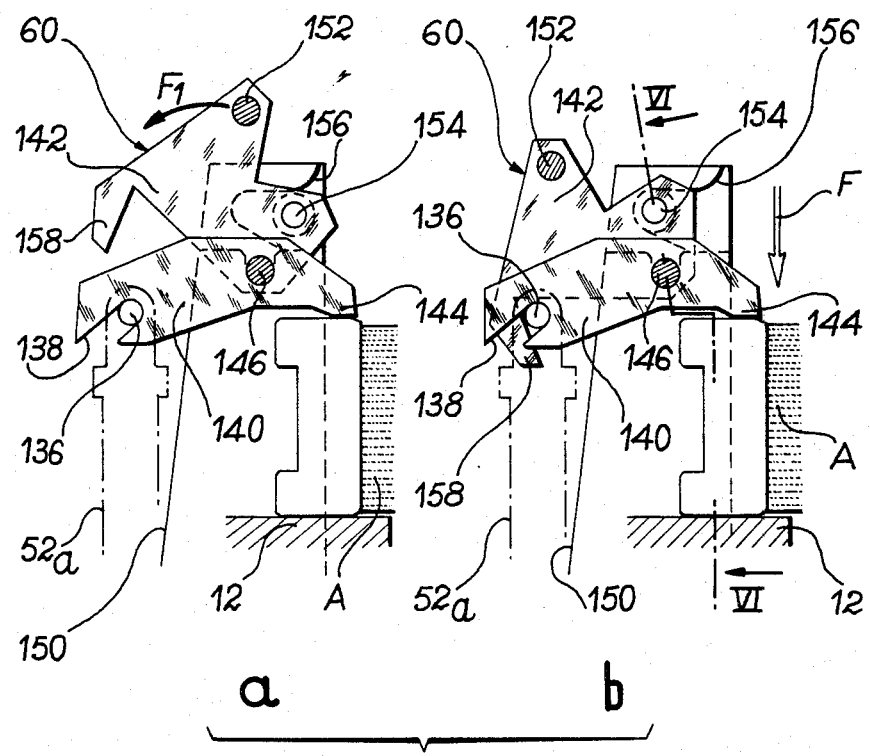
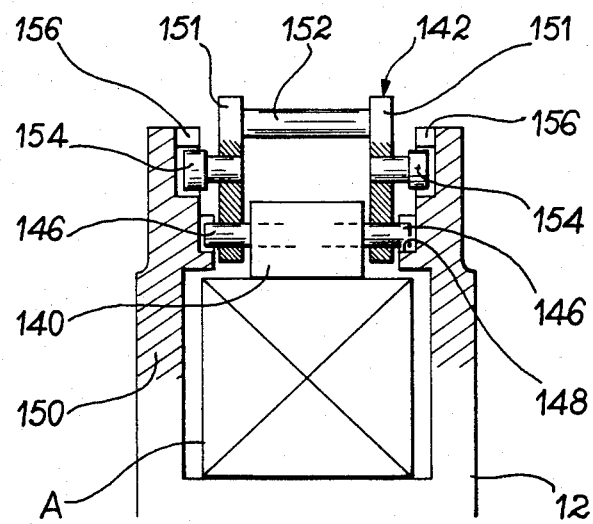
FIG. 5
FIG. 6

BAND SAW

The invention relates to a band saw of the kind comprising a plate supporting the workpiece to be sawn, a closed saw blade defining a cutting plane and supported by at least two wheels, one of which is a leading wheel rotated by control means, the saw also having means for moving the saw blade in relation to the workpiece to be sawn in the cutting plane. The invention also relates to an interchangeable casing supporting the blade of a saw of the kind specified.

BACKGROUND OF THE INVENTION

In a band saw of the kind specified the saw blade of course has a very short life in comparison with that of the elements making up the saw. More particularly, the life of the blade is generally limited by wear on its toothing, and, more rarely, by the breakage of the blade.

When the blade must be changed as a result of wear on its toothing, it must generally be cut for demounting before the saw is given a fresh blade, which must in its turn be welded in place. These operations call for relatively long interventions until the saw is restored to the operative condition. Such time is substantially further increased if the saw operates in unfavourable surroundings, since in that case the various operations have to be carried out from a distance, using suitable handling machines. In that case the time taken to replace the saw blade is all the more disadvantageous, since the saw may form one of the stations of a chain, so that the whole chain has to be stopped.

The second kind of event needing saw blade replacement, namely the breakage of the blade, has the major disadvantage in prior art band saws of being dangerous to both persons and apparatuses which may be near the saw. If the saw is in unfavourable surroundings, the apparatuses may amongst others be remote handling ones; clearly, the damage which they may suffer as a result of blade breakage may require particularly protracted and difficult operations to be performed.

Problem

It is an object of the invention to provide a band saw of the kind specified which is free from the disadvantages of the prior art saws and which amongst other things enables the saw blade to be replaced quickly if it wears or breaks, while preventing the blade from damaging apparatuses or injuring persons when it breaks.

BRIEF SUMMARY OF THE INVENTION

To this end the invention provides a band saw of the kind specified wherein the saw also comprises blade-tensioning means enabling at least one of the wheels to be moved between a tensioning position and an action-taking position, and a detachable casing which receives such blade, the casing and the blade which it contains forming an assembly which can be interchanged as a unit without any other demounting when the tensioning means retain such wheel in the action-taking position.

Preferably the casing comprises blade-retaining means against which the blade is resiliently stressed when the wheel is in the action-taking position, the blade being held at a distance from such retaining means when the wheel occupies the tensioning position. In that case, according to a possible feature of the invention the casing comprises a plate disposed on the blade side remote from its toothing, the retaining means comprising lugs which project from such plate, outside the saw blade, and beyond its toothing, the lugs having ends curved inwardly to opposite such toothing.

In a preferred embodiment of the invention, the wheels, the control means and the assembly formed by the casing and the blade are borne by an arm mounted to pivot on a frame bearing the base plate around an axis perpendicular to the cutting plane and offset in relation to the workpiece to be sawn, the means for moving the saw blade in relation to the workpiece to be sawn acting between the arm and the frame to control the rotation of the arm around such axis. Preferably the means for moving the saw blade in relation to the workpiece to be sawn are demountable, the saw also comprising a crutch adapted to support the arm during the demounting of such means.

According to another feature of this embodiment, the frame comprises a fixed portion comprising rails extending in a direction perpendicular to the cutting plane and a movable part comprising rollers moving over such rails, the movable portion of the frame bearing the wheels, the control means, the assembly formed by the casing and the blade, and also the means for moving the saw blade in relation to the workpiece to be sawn and means for traversing the movable portion along the rails of the fixed portion. In that case, according to another possible feature of the invention detachable anti-tilting means disposed between the fixed and movable portions of the frame normally prevent any movement of the movable portion away from the rails.

According to another feature of the invention, the saw also comprises means for clamping the workpiece to be sawn which are adapted to retain the same bearing against the base plate, such clamping means comprising an interchangeable portion adapted to the geometry of the workpiece to be sawn.

The invention also relates to an assembly provided for use in a band saw, wherein it comprises a closed saw blade and a casing which receives such blade, the casing comprising blade-retaining means against which the blade is resiliently stressed in the absence of blade tensioning, the retaining means being such that the blade can be moved away from them when it is tensioned.

DESCRIPTION OF DRAWINGS

An exemplary, non-limitative description will now be given of a preferred embodiment of the invention, with reference to the accompanying drawings, wherein:

FIGS. 5a and 5b are diagrammatic views showing the means for clamping the workpiece to be sawn, in the demounting and locking position of such workpiece respectively, FIG. 6 is a cross-sectional view of the clamping means, taken along the line VI—VI in FIG. b.

DETAILED DESCRIPTIONS OF THE PREFERRED EMBODIMENTS

Figure 1:
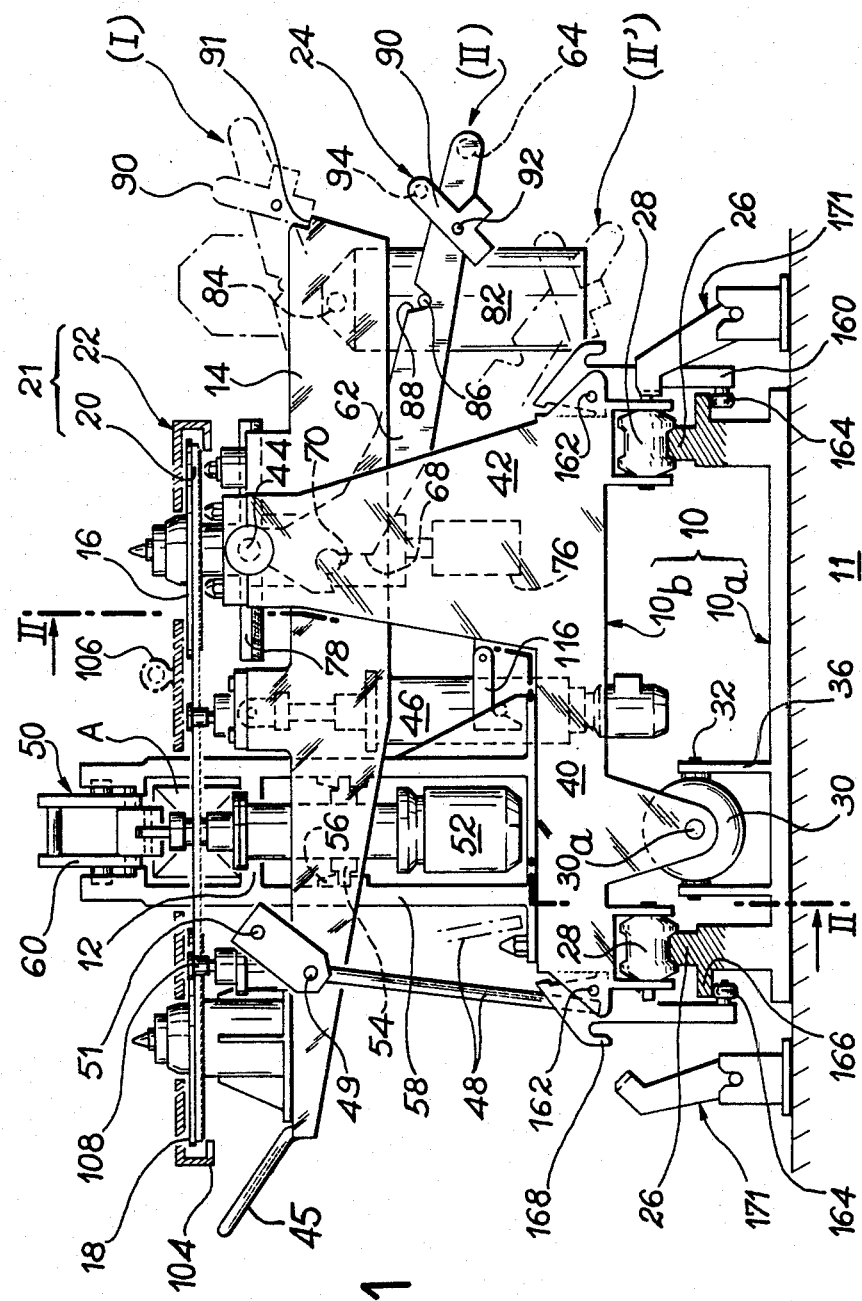
FIG. 1 is a diagrammatic elevation of a band saw according to the invention.

As shown more particularly in FIG. 1, a band saw according to the invention comprises a frame 10 comprising a fixed portion 10a which rests on the ground 11. The latter can be the floor of a confinement cell, if the saw is used in unfavourable surroundings. Members to be sawn A are introduced perpendicularly to the plane of FIG. 1, so that the latter is parallel with the vertical cutting plane of the saw, defined, as will be shown hereinafter, by a substantially rectilinear portion of a saw blade 20 forming a closed loop in a plane perpendicular to that of the drawing.

The frame 10 also comprises a movable portion 10b which supports a plate 12 on which the workpiece A to be sawn rests, and means 50 for clamping such workpiece. The movable portion 10b also supports an oscillatory arm 14 bearing the saw blade 20 via a leading wheel or pully 16 of vertical axis and a led wheel or pulley 18 of vertical axis, the two wheels being disposed in the same horizontal plane in the upper portion of the saw. According to the invention the saw blade 20 is mounted in a casing 22, and saw-blade-tensioning means 24 are provided.

More precisely, the fixed portion 10a of the frame rests on the ground 11 via a horizontal plate which supports two parallel rails 26 perpendicular with the cutting plane. The movable portion 10b comprises a horizontal plate 40 under which two pairs of wheels or rollers 28 are mounted which move in pairs over the rails 26. The spindles of the rollers are received in downwardly open notches 170. When a series of workpieces A of the same length are sawn, the portion 10b is kept immobile in relation to the portion 10a via the agency of known clamping means (not shown). On the other hand, when the position of the cutting plane is to be altered, for example, to change over from one kind of workpiece to another, the movable portion 10b must be shifted.

Figure 2:
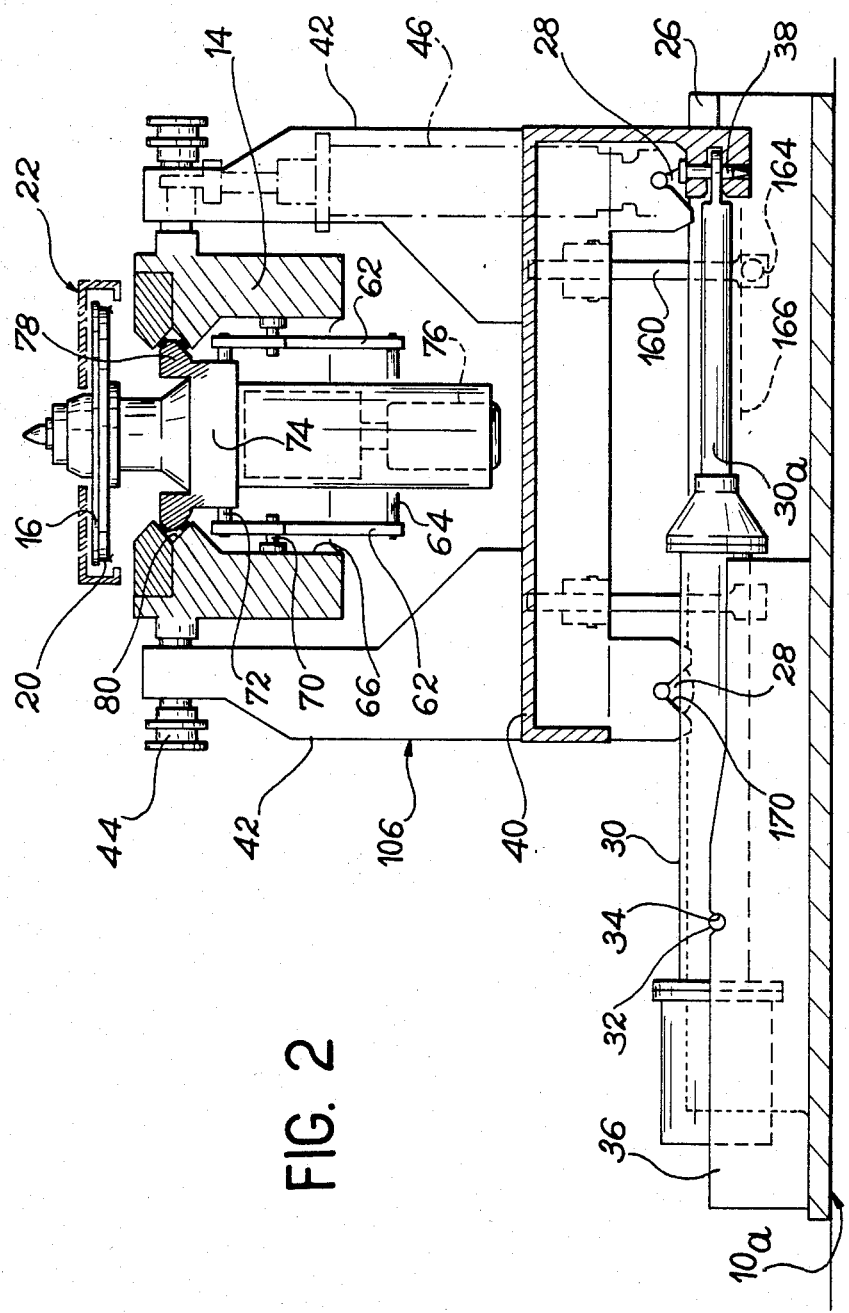
FIG. 2 is a sectional view, to an enlarged scale, along the line II—II in FIG. 1.

To this end, and as shown more particularly in FIG. 2, use is made of a jack 30 whose body rests by gravity on the fixed portion 10a via two radial rods 32 received in upwardly open notches 34 with which two vertical plates 36 connected to the fixed portion 10a of the frame are formed. The rod 30a of the jack 30 is disposed horizontally in a direction parallel with the direction defined by the rails 26 and is attached by its end to the mobile portion 10b of the frame, for example by means of a pin 38.

To prevent the movable portion 10b from being accidentally shifted upwards, anti-tilting devices 160 (FIG. 1) are mounted to pivot via spindles 162 on the plate 40. The devices 160 bear at their lower ends rollers 164 which bear against downwardly turned horizontal rolling surfaces 166 formed on the rails 26. The tilting of the devices 160 around the spindles 162 can be controlled from a distance via hooks 168.

As shown in FIGS. 1 and 2, the movable portion 10b comprises two arms 42 which project vertically upwards from the horizontal plate 40. At their upper ends the two arms 42 bear the oscillating arm 14 pivotably around a horizontal pivot 44 perpendicular with the cutting plane and offset in relation to the plate 12 supporting the workpiece A to be sawn. The arm 14 is substantially horizontal and bears the leading wheel 16 vertically above the spindle 44 and the led wheel 18 at its opposite end. The latter end also bears a lifting ring 45, for handling reasons which will be disclosed hereinafter.

The pivoting of the arm 14 around the pivot 44 is controlled by a jack 46 whose body is connected to the movable portion 10b of the frame and whose rod extends upwards in a substantially vertical direction to be connected by its end to the arm 14. Of course, the axis of the jack 46 is offset in relation to the vertical plane containing the pivoting axis 44 of the arm 14 and is disposed between such vertical plane and the base plate 12 in the variant illustrated.

As will be demonstrated hereinafter, the jack 46 can be demounted, so that a means must be provided to prevent the support 14 from rotating around its pivot 44 when action is taken on such jack. For this purpose, FIG. 1 shows how a crutch 48 mounted to pivot on the arm around a pivot 49 is provided adjacent the end of the arm 14 bearing the lifting ring 45. The crutch has a manoeuvring bar 51 enabling it to be pivoted into the position shown in chain-dot lines in FIG. 1, when the arm 14 is lifted by acting on the ring 45 after the jack 46 has been demounted. The jack can then be replaced without difficulty and without the need to retain the arm 14 by an external lifting means.

FIG. 1 also shows how the clamping means 50 enabling the workpiece A to be sawn to be kept bearing against the base plate 12 comprise a demountable control jack 52. The body of the jack has radial rods 54 received in upwardly open notches formed in arms 58 which extend vertically upwards from the plate 40 and also support the base plate 12. The rod of the jack 52 extends vertically upwards from the latter and acts on the workpiece A via an interchangeable portion 60 which will be described in greater detail hereinafter.

According to the invention the band 20 has tensioning means 24 provided for the tensioning of the band when the saw is operating and for the demounting of the band, as will be described hereinafter.

As shown inter alia in FIGS. 1 and 2, the tensioning means 24 comprise two lever-type flanges 62 connected at one end by a strut which ensures that they are kept at a distance. The flanges 62 are disposed inside a recess 66 formed in the arm 14, and they are mounted to pivot on the arm 14 via the agency of two aligned pivots 70 disposed adjacent the vertical plane containing the pivot 44 of the arm 14. The pivoting pivots defined by the axes 70 is parallel with the pivot 44 and disposed therebelow. The flanges 62 are also disposed in such a way that the strut 64 lies on the side opposite that of the led pulley, in relation to the pivots 44 and 70. As shown in FIG. 1, to enable them to be mounted and demounted from a distance, the flanges 62 have on their lower edges and downwardly open notch 68 in which the pivots 70 engage.

Figure 3:
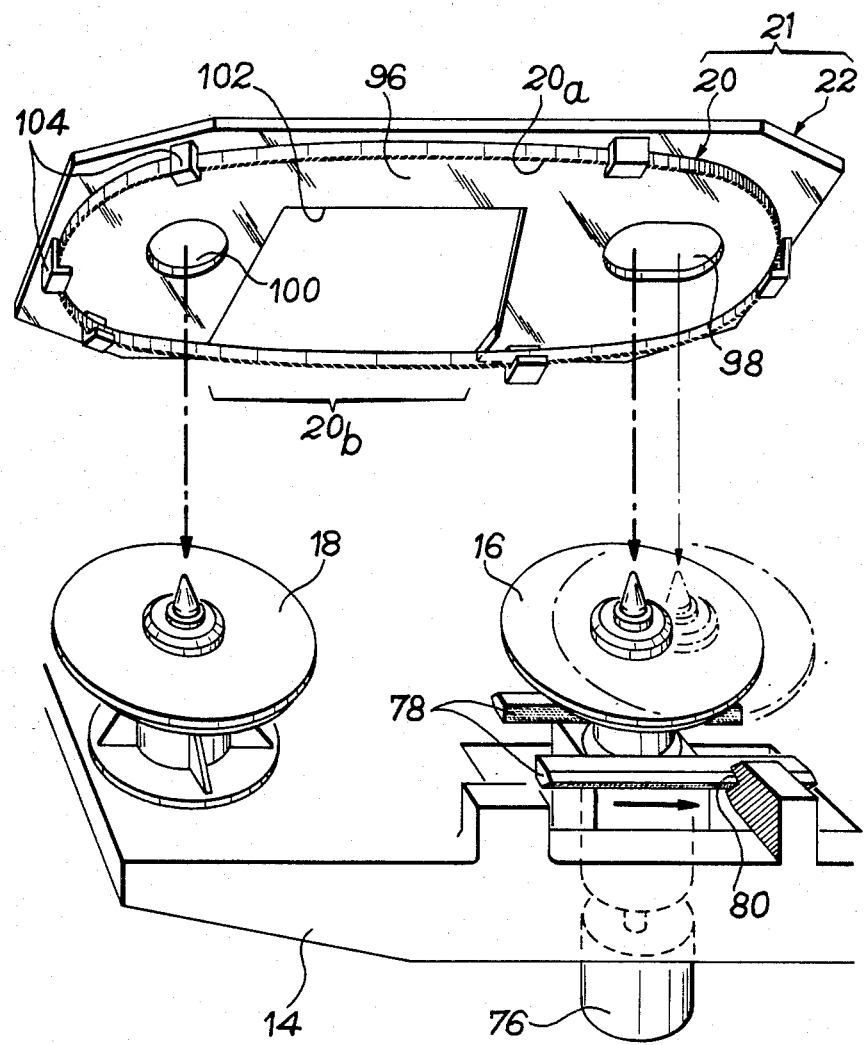
FIG. 3 is a perspective view illustrating the mounting of the assembly formed by the saw blade and the casing supporting it on the upper part of the band saw illustrated in FIGS. 1 and 2, FIGS. 4a and 4b are perspective views, a showing the connecting means which can be demounted from a distance and which are associated with the body and rod of the jack controlling the movement of the saw blade in the cutting plane, b showing the connecting means associated with the rod of the jack.

FIG. 2 shows how the flanges 62 are also articulated via aligned axes 72 to a member 74 supporting the leading wheel 16 and the motor 76 controlling its rotation. The pivots 72 are parallel with the pivots 70 and 44 and are disposed adjacent this latter. As shown inter alia in FIGS. 2 and 3, the member 74 has two horizontal slides 78 which extend perpendicularly to the pivot 44—i.e., in a direction parallel with the cutting plane defined by the rectangular portion 20b of the saw blade 20. The slides 78 define on their opposite faces V-shaped sliding surfaces which are received in matching grooves 80 formed in the support 14. This configuration enables the assembly formed by the member 74, the pulley 16 and the motor 76 to move parallel with the cutting plane defined by the portion 20b of the blade 20, between a blade-tensioning position and an action-taking position, shown in chain-dot lines and solid lines respectively in the drawing. According to the invention, and also as illustrated in FIG. 3, the action-taking position enables the assembly 21 formed by the blade 20 and the casing 22 to be changed in a manner disclosed in greater detail hereinafter.

Clearly, this displacement of the pulley 16 is obtained by acting on the strut 64 connecting the flanges 62, to cause them to pivot around the pivot 70. As shown in FIG. 1, such pivoting enables the flanges 62 to move between a position (I), corresponding to the action-taking position for the pulley 16, and a position (II) corresponding to the tensioning of the blade 20. FIG. 1 shows two positions (II) and (II') corresponding to two saw blades 20 of different length.

The blade is tensioned in the position (II) or (II') by means of a counterweight 82 resting on the flanges 62 adjacent their end bearing the strut 64. The counterweight is interchangeable and comprises for this purpose a horizontal handling rod 84. It also rests on the flanges 62 via radial rods 86 which bear against upwardly open notches 88 formed in the top edge of the flanges 62. It should be noted that the counterweight 82 also equilibrates the oscillatory arm 14, thus very appreciably reducing the forces which must be applied to it by the jack 46 and the load supported by the crutch 48 when action is taken on the jack 46.

Of course, means must be provided to retain the flanges 62 in the position (I) corresponding to the action-taking position for the leading wheel 16, taking into account the action of the counterweight 82, which tends to return the flanges to the position (II) or (II'). These means are formed by a linkage 90 articulated around a pivot 92 on the flanges 62 and having a handling arm 94. In the position (I) (FIG. 1), it can be seen that the bottom of the linkage 90 bears against an abutment 41 formed at the end of the arm 14 and on its upper edge, so that the flanges 62 are locked in that position.

In a variant embodiment which is not shown, the tensioning counterweight 82 might be replaced by a jack acting between the flanges 62 and the oscillatory arm 14.

When the blade 20 is to be detensioned, action is taken on the strut 64 connecting the flanges 62 so as to cause them to pivot around the pivot 70, the result being that the assembly formed by the member 74, the motor 76 and the pulley 16 are slid to the left, as shown in FIG. 1. The linkage 90 then locks the flanges 62 in the position (I), in which the pulley 16 occupies the action-taking position shown in solid lines in FIG. 3, in which the assembly 21 according to the invention can be replaced.

Referring now to FIG. 3, it can be seen that the saw blade 20 forms a close loop in a horizontal plane, the flat of the blade being disposed vertically, so that the toothing 20a is turned downwards. In the variant illustrated, the casing 22 also comprises a substantially flat plate 26 adapted to be disposed horizontally in the upper portion of the saw, above the wheels 16 and 18 supporting the blade 20—i.e., on the side of the blade remote from the toothing 20a. The plate 96 has a substantially rectangular shape whose width is slightly larger than the diameter of the wheels 16 and 18 and whose length is such that it extends from one wheel to the other, and slightly beyond each of the wheels. As shown in FIG. 3, the rectangular plate 96 can have cut-off corners, and it comprises a first hole 93 through which the spindle of the pulley 16 extends, and a second hole 100 through which the spindle of the pulley 18 extends. The hole 98 has an oblong shape so as to enable the pulley 16 to move between its two end positions under the action of the tensioning means 24 disclosed hereinbefore. In contrast, the hole 100 is circular, since the pivot of the wheel 18 is fixed. The plate 96 also has a cutaway portion 102, allowing the passage of the arms 58 supporting the base plate 12 and the clamping means 50, as illustrated in FIG. 1.

To connect the saw blade 20 with the casing 22 when the blade is to be changed, the casing also has retaining means formed by lugs 104 which are disposed in the immediate vicinity of the saw blade 20, outside the closed loop defined thereby. The lugs 104 project vertically downwards from the plate 96, as shown in FIGS. 1 to 3. More precisely, the lugs 104 are prolonged downwards beyond the toothing 20a formed at the lower edge of the blade 20, and their ends terminate in a portion bent inwardly to opposite the toothing 20a.

The closed loop formed by the saw blade 20 comprises two portions in the arc of a circle which are adapted to come over the leading wheel 16 and the led wheel 18 respectively, and two substantially rectilinear portions connecting such portions in the arc of a circle, one of them 20b, defining the vertical cutting plane of the saw. If it is remembered that the saw blade 20 behaves substantially like the leaf of a spring, tending to adopt a circular shape, it will be understood that the lugs 104 can be so disposed that the saw blade 20 is at a distance on them when it is mounted on the saw and when it is tensioned by the tensioning means 24. On the other hand, the blade 20 contacts at least some of the retaining lugs 104 as soon as the leading pulley 16 is moved into the action-taking position, relaxing the tensioning of the blade by the tensioning means 24.

As a result of this feature, there is no contact between the blade 20 and the casing 22 during the normal operation of the saw, thus preventing any premature wear on the blade. In contrast, as soon as the blade 20 is detensioned, it contacts the retaining lugs 104 so that the assembly 21 which it forms with the casing 22 can then be interchanged as required. For this purpose, it is important to note that the saw is so designed that the assembly can be mounted and demounted as soon as the pulley 16 is in the action-taking position, without the need to demount any other member of the saw. To allow the remote handling of the assembly 21, the plate 26 can be provided with gripping means, such as a ring 106 (FIG. 1). According to the invention, therefore, the saw blade can be very quickly and readily changed by changing the assembly 21. In this respect it should be noted that the blade 20 remains in the casing 22, even when the blade breaks.

FIG. 1 shows how the rectilinear portion 20b of the saw blade 20 for sawing the workpieces 30a can be precisely positioned by blade-guiding rollers 108 mounted for this purpose on the arm 14 on either side of the base plate 12. Of course, the rollers 108 are so arranged that the blade 20 is released by its rollers when it is detensioned by the tensioning means 24.

When the saw 10 according to the invention is mounted in a confinement cell, as is the case in the embodiment described, it may be necessary to provide means for taking remote-control action on certain active member of the saw. More particularly, the jacks enabling the various movements of the saw to be controlled are preferably locked on the members between which they act, by fixing means which can be demounted from a distance.

It has already been seen from FIG. 2 that the body of the jack 30 rests simply by gravity on the plate 36 of the fixed portion 10a of the frame, and that the rod 30a is attached by a key 38 to the movable portion 10b.

Figure 4:
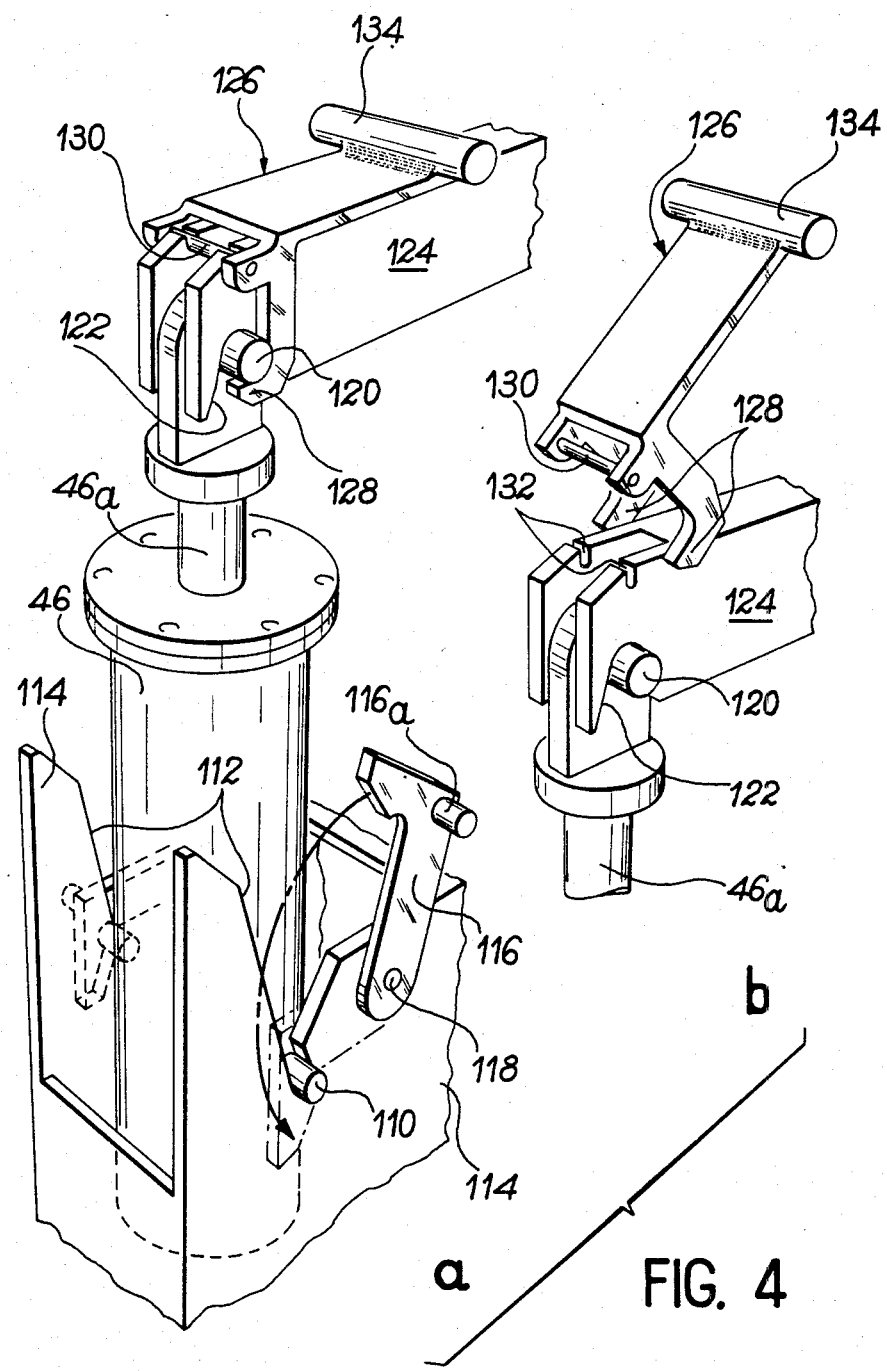

As shown more particularly in FIG. 4, a structure of the same type is provided for the jack 46 which controls the pivoting of the support 14 around its pivot 44—i.e., in fact the sawing of the workpieces A.

FIG. 4a shows that the body of the jack 46 bears radial rods 110 which are received in upwardly open notches 112 formed in the upper edge of two vertical plates 114 attached to the horizontal plate 40 of the mobile portion of the frame. The plates 114 also bear levers 116 which have manoeuvring fingers 116a and pivot around pivots 18, so that they normally lock the rods 110 in the bottom of the notches 112, as shown in FIG. 4a. The pivoting of the levers 116 enables the rods 110 to be disengaged when the body of the jack 46 is to be demounted.

In a comparable manner, the rod 46a of the jack 46, which projects vertically upwards from the body of the jack, bears at its end lateral rods 120 which engage in downwardly open notches 122 formed in the lower edge of a fork 124 connected to the support 14.

As shown in FIGS. 4a and 4b, the rod 46a is connected to the fork 124 via a connecting member 126, namely a detachable member which straddles the fork 124 and comprises two lugs 128 bent in hook form, their ends taking position below the rods 120 to prevent the latter from escaping from the notches 122 when the member 126 is mounted, as shown in FIG. 4a. The member 126 also comprises a horizontal rod 130 which fits into upwardly open notches 132 formed on the upper edge of the fork 124, above the notches 122. Clearly, when the rod 130 bears against the bottom of the notches 132, as shown in FIG. 4a, the hook-shaped ends of the lugs 128 apply the rods 120 to the bottom of the notches 122. The member 126 also comprises a rehandling lug 134 which normally bears against the upper face of the fork 124 when the member 126 is in place, as shown in FIG. 4a. When an upward pull is exerted on the handling lug 134, the member 126 is pivoted around the rod 130, the effect of this being to release the rods 120. The member 126 can then be withdrawn, as shown in FIG. 4b, and the rod 46a of the jack 46 is then disengaged from the fork 124.

It has already been seen from FIG. 1 that the body of the jack 52 comprises radial rods 54 via which it rests by gravity in notches 56 formed in the arms 58 also serving to support the base plate 12. As shown by FIGS. 5 and 6, the rod 52a of the jack 52 can also be demounted from a distance, and so can the detachable portion 60 of the locking means.

FIGS. 5a and 5b show how the rod 52a, which projects vertically upwards from the body of the jack 52, bears at its upper end lateral rods 136 which normally bear against the bottom of downwardly open notches 138 at one of the ends of a lever-shaped flange 140 which co-operates with a clamping head 142 to form the detachable portion 60. The flange 140 defines on its lower face and at its opposite end an abutment 144 which bears against the upper face of the workpiece A to be sawn. The flange 140 pivots around an intermediate axis taking the form of rods 146, so that when the rod 52a of the jack is stressed upwards, the abutment 144 moves downwards to apply the workpiece A against the base plate 12 so as to enable the saw blade 20 to saw such workpiece, as shown by the arrow F in FIG. 5b.

The rods 146 of the flange 140 defining the pivoting axis thereof are received in upwardly open notches 148 formed in a clevis 150 formed by the upper end of the arms 58.

The connection between the rod 52a and the flange 140, and the connection between the flange 140 and the clevis 150 are locked by means of the clamping head 142 which comprises, as shown in FIG. 6, two flanges 150 rotatably connected to the flange 150 via the rods 146 and interconnected by a handling pivot 152. Each of the flanges bears on its outer face a clamping roller 154 which engages in a notch 156 formed in the clevis 150 above the notches 148. The notches 156 are open on the side of the abutment 144 of the flange 140, and their upper edges define rollways for the corresponding rollers 154, as shown in particular in FIGS. 5a and 5b. FIG. 5a shows that the positioning of the detachable portion 60 is first performed by putting the flange 140 in place—i.e., on the one hand by introducing the rods 136 into the notches 138, and on the other hand by introducing the rods 146 into the notches 148. The rods 146 then form a pivot for the clamping head 142, which is rotated in the direction indicated by the arrow $F_1$. The rollers 154 then move over the rollways defined by the upper edges of the notches 156, until the rollers 154 abut the bottom of such notches. The rollers 154 are then offset on the side of the rod 52a in relation to the pivot 146, as shown in FIG. 5b, so that they act as a support for the flange 140 and the jack 52 is operated.

As shown in FIG. 5, the clamping head 142 also locks the rods 136 in the notches 138. For this purpose each of the flanges 151 has a hook-shaped portion 158 which forces the rods 136 into the bottom of the notches 138 when the head 142 is in the operational position, as shown in FIG. 5b.

The configuration just described with reference to FIGS. 5 and 6 at one and the same time enables the rod of the jack 52 to be demounted from a distance and makes the portion 60 formed by the flange 150 and the clamping head 142 interchangeable. This feature is particularly advantageous when the dimensions of the workpiece A to be forced against the base plate 12 vary, since in that case it is easy to adapt the portion 60 to the dimensions of the workpiece to be sawn A by replacing the portion 60 by another portion 60 comprising a flange 140 of different dimensions, inter alia at the level of the abutment 140.

Finally, it may be necessary to retain the wheels 28 of the movable portion 10b of the frame when the jack 30 must be demounted.

Figure 7:
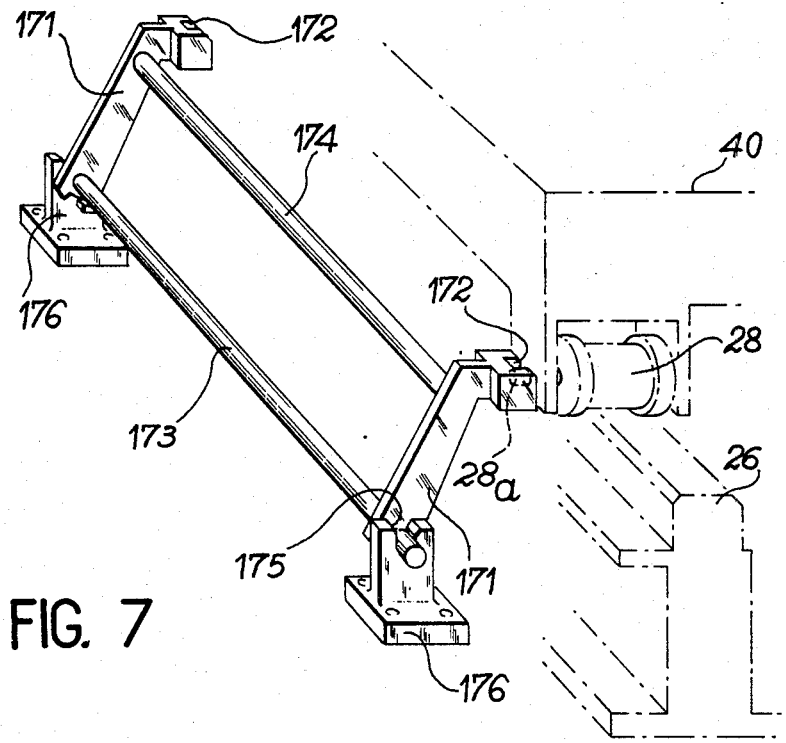
FIG. 7 is a perspective view of the means enabling the rollers of the mobile portion of the frame of the saw illustrated in FIGS. 1 and 2 to be retained when such movable portion and the members which it supports are to be replaced.
Figure 8:
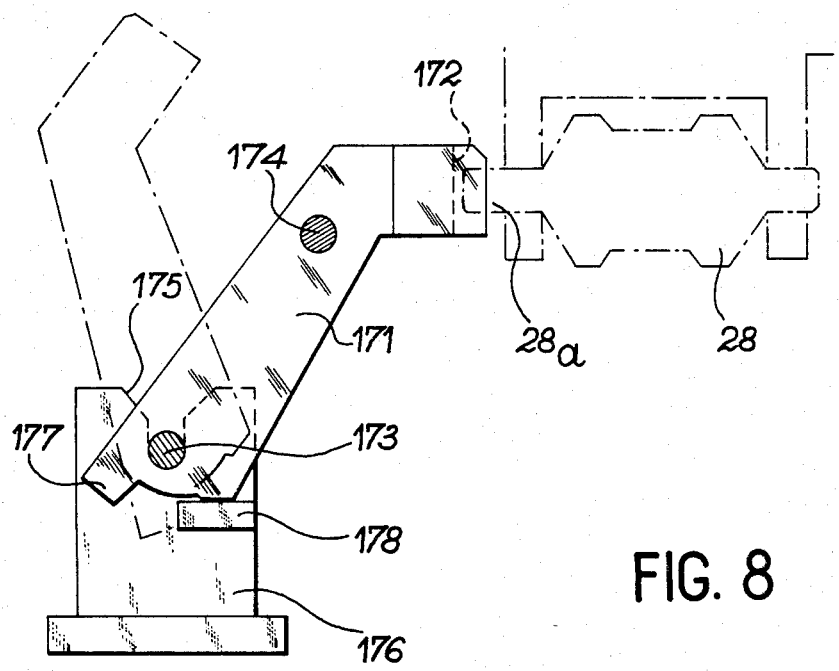
FIG. 8 is a side elevation, to an enlarged scale, of the retaining means shown in FIG. 7.

For this purpose, as shown in FIGS. 7 and 8, the pivots 28a of the rollers 28 project beyond the notches 170, so that they can engage in abutment grooves 172 formed in retaining members 171 which are disposed towards the outside of the rails 26 in relation to the movable portion 10b, and opposite each roller 28. If the movable portion 10b is supported by four rollers 28, each rail is therefore associated with a pair of retaining members 171 interconnected via a pivoting spindle 173 and a gripping rod 174. The pivoting spindle 173 is received at its ends in upwardly open notches 175 in supports 176 resting directly on the floor 12 of the cell. As shown in chain-dot lines in FIG. 8, the retaining members 171 normally occupy a position in which the abutment grooves 172 are disengaged from the spindles 28a of the rollers 28. This position is determined by an abutment 177 formed on each member 171 bearing against an abutment 178 formed on the supports 176. As shown in solid lines in FIG. 8 and also in FIG. 7, the members 171 can be tilted by taking remote action on the rod 174, so that the grooves 172 fit over the ends of the rollers 28.

Of course, the invention is not limited to the embodiment which has just been described by way of example, but covers all variants. More particular, although the invention is particularly adapted to the sawing of workpieces in difficult surroundings, it is not limited to that application. Consequently, inter alia the means for taking remote-control action which have been described can if necessary be eliminated or modified without exceeding the scope of the invention. Comparably, it will be understood that the casing supporting the saw blade might be differently designed from that which has been described, without exceeding the scope of the invention. The same thing of course goes for the means enabling the blade to be tensioned. In this respect, it will be noted more particularly that the blade-tensioning means can act either on the leading wheel, as described, or on a led wheel. Of course, the number of wheels on which the blade is mounted can also be greater than two, the shape of the loop formed by such blade and also the shape of the casing being of course adapted to the number and particular arrangement of such wheels.

What is claimed is:

1. A band saw comprising a plate supporting the workpiece to be sawn, a closed saw blade defining a cutting plane and supported by at least two wheels, one of which is a leading wheel rotated by control means, the saw also having means for moving the saw blade in relation to the workpiece to be sawn in the cutting plane, wherein the saw also comprises blade-tensioning means enabling at least one of the wheels to be moved between a tensioning position and an action-taking position, and a detachable casing which receives such blade, the casing and the blade which it contains forming an assembly which can be interchanged as a unit without any other demounting when the tensioning means retain such wheel in the action-taking position.

2. A band saw according to claim 1, wherein the casing comprises blade-retaining means against which the blade is resiliently stressed when the wheel is in the action-taking position, the blade being held at a distance from such retaining means when the wheel occupies the tensioning position.

3. A band saw according to claim 2, wherein the casing comprises a plate disposed on the blade side remote from its toothing, the retaining means comprising lugs which project from such plate, outside the saw blade, and beyond its toothing, the lugs having ends curved inwardly to opposite such toothing.

4. A band saw according to claim 1, wherein the wheels, the control means and the assembly formed by the casing and the blade are borne by an arm mounted to pivot on a frame bearing the base plate around an axis perpendicular to the cutting plane and offset in relation to the workpiece to be sawn, the means for moving the saw blade in relation to the workpiece to be sawn acting between the arm and the frame to control the rotation of the arm around such axis.

5. A band saw according to claim 4, wherein the means for moving the saw blade in relation to the workpiece to be sawn are demountable, the saw also comprising a crutch adapted to support the arm during the demounting of such means.

6. A band saw according to claim 4, wherein the frame comprises a fixed portion comprising rails extending in a direction perpendicular to the cutting plane and a movable part comprising rollers moving over such rails, the movable portion of the frame bearing the wheels, the control means, the assembly formed by the casing and the blade, and also the means for moving the saw blade in relation to the workpiece to be sawn and means for traversing the movable portion along the rails of the fixed portion.

7. A band saw according to claim 6, wherein detachable anti-tilting means disposed between the fixed and movable portions of the frame normally prevent any movement of the movable portion away from the rails.

8. A band saw according to claim 1, wherein it also comprises means for clamping the workpiece to be sawn which are adapted to retain the same bearing against the base plate, such clamping means comprising an interchangeable portion adapted to the geometry of the workpiece to be sawn.

9. An assembly provided for use in a band saw, wherein it comprises a closed saw blade and a casing which receives such blade, the casing comprising blade-retaining means against which the blade is resiliently stressed in the absence of blade tensioning, the retaining means being such that the blade can be moved away from them when is it tensioned, the casing including a plate disposed on the blade side remote from its toothing, the retaining means comprising lugs which project from such plate, outside the saw blade and beyond its toothing, such lugs having ends curved inwardly to opposite the toothing.

* * * * *